(12) United States Patent
Goto et al.

(10) Patent No.: US 12,500,515 B2
(45) Date of Patent: Dec. 16, 2025

(54) RESONANCE POWER SUPPLY CIRCUIT

(71) Applicant: FANUC CORPORATION, Yamanashi (JP)

(72) Inventors: Kazuya Goto, Yamanashi (JP); Yoshinori Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 253 days.

(21) Appl. No.: 18/039,398

(22) PCT Filed: Jan. 6, 2022

(86) PCT No.: PCT/JP2022/000175
§ 371 (c)(1),
(2) Date: May 30, 2023

(87) PCT Pub. No.: WO2022/153911
PCT Pub. Date: Jul. 21, 2022

(65) Prior Publication Data
US 2024/0006989 A1 Jan. 4, 2024

(30) Foreign Application Priority Data

Jan. 12, 2021 (JP) ................................. 2021-003032

(51) Int. Cl.
*H02M 3/28* (2006.01)
*H02M 1/00* (2007.01)
(Continued)

(52) U.S. Cl.
CPC ........... *H02M 3/01* (2021.05); *H02M 1/0022* (2021.05); *H02M 1/008* (2021.05); *H02M 1/325* (2021.05);
(Continued)

(58) Field of Classification Search
CPC ............. H02M 1/0003; H02M 1/0009; H02M 1/0019; H02M 1/0022; H02M 1/008;
(Continued)

(56) References Cited

U.S. PATENT DOCUMENTS 6,317,337 B1 * 11/2001 Yasumura ........... H02M 3/3385
363/21.04
2008/0285311 A1 * 11/2008 Aso ................... H02M 3/33571
363/21.01
(Continued)

FOREIGN PATENT DOCUMENTS

JP 2001314079 A * 11/2001 .......... H02M 3/3385
JP 2004194405 A * 7/2004
(Continued)

OTHER PUBLICATIONS

International Search Report issued Mar. 22, 2022 in corresponding International Application No. PCT/JP2022/000175.

*Primary Examiner* — Thienvu V Tran
*Assistant Examiner* — Shahzeb K Ahmad
(74) *Attorney, Agent, or Firm* — Wenderoth, Lind & Ponack, L.L.P.

(57) ABSTRACT

The resonance power supply circuit is provided with a transformer provided with primary and secondary winding wires, first and second switching elements for applying a rectangular wave voltage to one end of the primary winding wire, a resonance capacitor connected to the other end of the primary winding wire, and a control unit that alternately turns on and off the first and second switching elements. The resonance power supply circuit is further provided with a first output circuit including first and second rectification elements, a first capacitor, an output capacitor, and a back-flow prevention rectification element, a second output circuit including third and fourth rectification elements, a second capacitor, the output capacitor, and a third switching element
(Continued)

provided between the second capacitor and the output capacitor, and a circuit for providing, as feeding back, voltage information indicating a first voltage of the first capacitor to the control unit.

4 Claims, 9 Drawing Sheets

(51) Int. Cl.
*H02M 1/32* (2007.01)
*H02M 3/00* (2006.01)
*H02M 3/335* (2006.01)

(52) U.S. Cl.
CPC ....... *H02M 3/285* (2013.01); *H02M 3/33569* (2013.01)

(58) Field of Classification Search
CPC ........ H02M 1/325; H02M 3/01; H02M 3/285; H02M 3/335; H02M 3/33507; H02M 3/3353; H02M 3/33538; H02M 3/33569; H02M 3/33571; H02M 3/33573; H02M 3/33576; H02M 3/33592; H02M 3/337; Y02B 70/10
See application file for complete search history.

(56) References Cited

U.S. PATENT DOCUMENTS

| | | | | |
|---|---|---|---|---|
| 2009/0141519 | A1* | 6/2009 | Hong | H02M 3/33576 363/21.01 |
| 2013/0250622 | A1* | 9/2013 | Hosotani | H02M 3/33576 363/16 |
| 2014/0225552 | A1* | 8/2014 | Shinomoto | H02M 1/4225 318/504 |
| 2016/0079865 | A1* | 3/2016 | Yamaji | H02M 3/33571 363/21.02 |

FOREIGN PATENT DOCUMENTS

| | | |
|---|---|---|
| JP | 2009-542175 | 11/2009 |
| JP | 2013-188057 | 9/2013 |
| JP | 2016-59258 | 4/2016 |
| JP | 2020-107434 | 7/2020 |

* cited by examiner

RESONANCE POWER SUPPLY CIRCUIT

TECHNICAL FIELD

The present invention relates to a resonance power supply circuit, and, in particular, a resonance power supply circuit that alternately turns on and off a first switching element and a second switching element to cause a primary winding wire in a transformer and a resonance capacitor to resonate with each other to cause a secondary winding wire to induce an alternating-current voltage.

BACKGROUND ART

The resonance power supply circuit employs a circuit style, in which two types of operations, i.e., current resonance operation and soft-switching, are both combined with each other and it is possible to allow a transformer to have a resonance inductance utilizing a leakage inductance, and thus has widely prevailed as a small-size high-efficiency converter that offers low electromagnetic interference (EMI) noise. The resonance power supply circuit alternately uses a winding wire on a secondary side in accordance with switching on a primary side (in a direction in which a resonance current flows) to supply power.

As a resonance power supply circuit, for example, Patent Document 1 describes a switching power supply device that employs an LLC style that makes it possible to stably supply power to a load circuit in which large load fluctuations may occur. Specifically, Patent Document 1 describes that the switching power supply device includes a transformer in which a secondary winding wire is divided into a plurality of winding wire units, a resonance capacitor, a first switching element, and a second switching element. Furthermore, it is also described that this switching power supply device includes a plurality of rectification diodes that extract, per winding wire unit, a voltage induced in the secondary winding wire, an output voltage switching circuit that switches and outputs the voltage extracted from the plurality of rectification diodes, a current detection circuit that detects a current flowing in the load circuit, and a controller that controls the output voltage switching circuit based on a detection result in the current detection circuit.

Furthermore, as a method of causing a resonance power supply to operate, for example, Patent Document 2 describes that there is a step of controlling the resonance power supply in a discontinuous aspect. Patent Document 2 then describes, as an example, that the resonance power supply includes a first switching element and at least one energy storing element, and the step of controlling the resonance power supply in a discontinuous aspect includes a step of initializing a stand-by operation by causing energy to be transmitted from the at least one energy storing element to the first switching element to make it possible to execute soft-switching for the first switching element.

Patent Document 1: Japanese Unexamined Patent Application, Publication No. 2016-59258
Patent Document 2: Japanese Unexamined Patent Application (Translation of PCT Application), Publication No. 2009-542175

DISCLOSURE OF THE INVENTION

Problems to be Solved by the Invention

As to a ratio between a winding wire on a primary side and a winding wire on a secondary side in a transformer, an optimum ratio is determined based on a ratio between input and output voltages. The optimum constants for the peripheral constants (an excitation inductance Lm, a leakage inductance Lr, and a resonance capacitor Cr), also vary. Therefore, when it is necessary to greatly change an output voltage, it is required to prepare separate resonance power supply circuits for each output voltage. In this case, there are factors of increase in size and cost, and of decrease in cost effectiveness due to the other resonance power supply circuit not being used. Therefore, such a resonance power supply circuit has been demanded that includes a single small-size inexpensive circuit that outputs a plurality of different output voltages.

Means for Solving the Problems

One aspect of the present disclosure is directed to a resonance power supply circuit including: a transformer including a primary winding wire and a secondary winding wire including at least a first winding wire and a second winding wire; a first switching element and a second switching element that apply a rectangular wave voltage to one end of the primary winding wire; a resonance capacitor coupled to another end of the primary winding wire; a controller that alternately turns on and off the first switching element and the second switching element to cause the primary winding wire and the resonance capacitor to resonate with each other; a first output circuit including a first rectification element and a second rectification element that extract a first alternating-current voltage induced in the secondary winding wire, a first capacitor that smoothens the extracted first alternating-current voltage, an output capacitor that outputs an output voltage, and a backflow prevention rectification element that suppresses a current flowing from the output capacitor into the first capacitor; a second output circuit including a third rectification element and a fourth rectification element that extract a second alternating-current voltage induced in the secondary winding wire, a second capacitor that smoothens the extracted second alternating-current voltage, the output capacitor, and a third switching element provided between the second capacitor and the output capacitor; and a feedback circuit that feeds back voltage information indicating a first voltage of the first capacitor to the controller.

Effects of the Invention

According to each aspect of the present disclosure, it is possible to use a single small-size inexpensive circuit to output a plurality of different output voltages.

PREFERRED MODE FOR CARRYING OUT THE INVENTION

Embodiments of the present disclosure will now be described herein in detail with reference to the accompanying drawings.

First Embodiment

Figure 1:
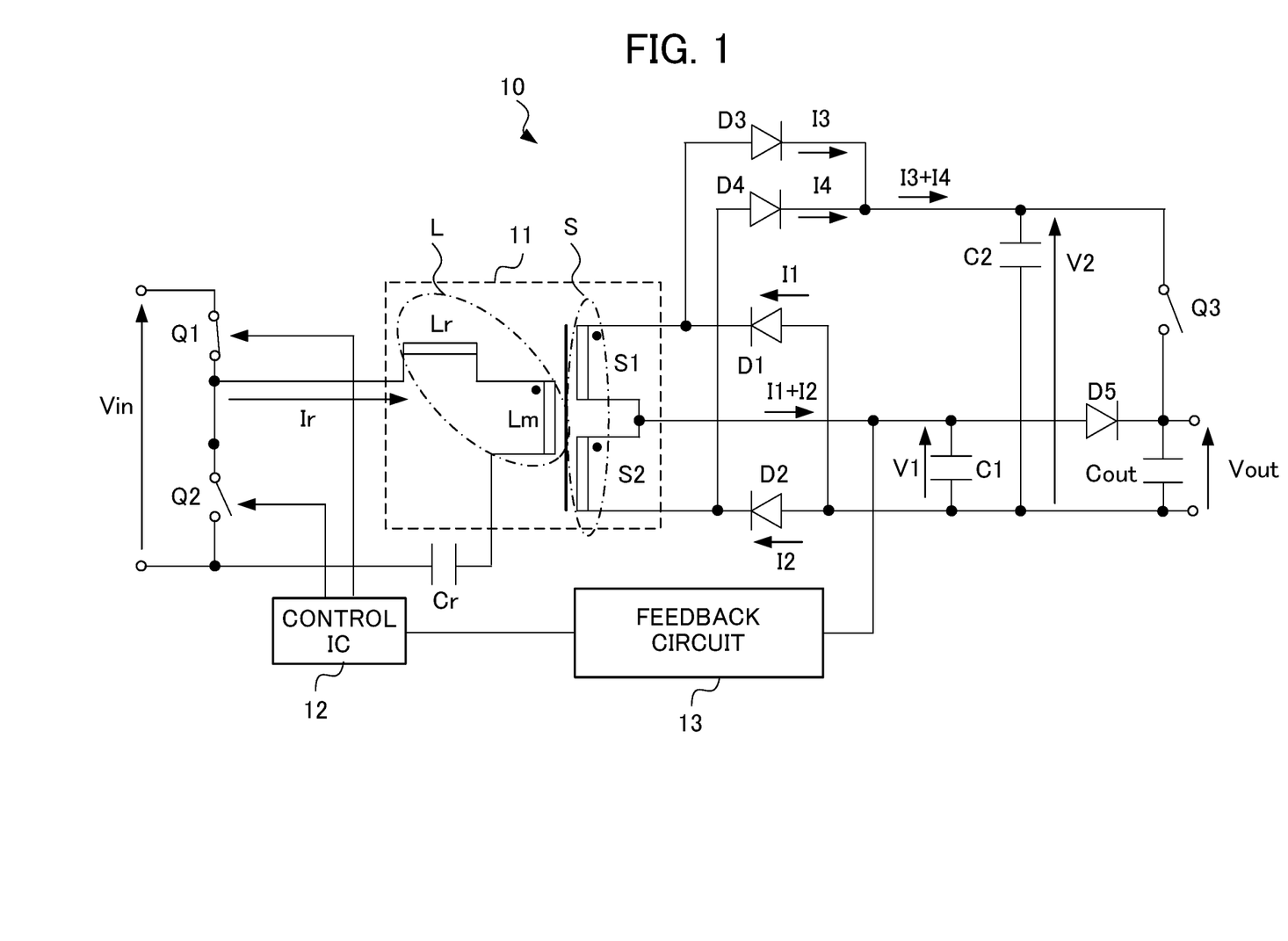
FIG. 1 is a circuit diagram illustrating a resonance power supply circuit according to a first embodiment of the present disclosure.

FIG. 1 is a circuit diagram illustrating a resonance power supply circuit according to a first embodiment of the present disclosure. A resonance power supply circuit 10 includes a switching element Q1 serving as a first switching element, a switching element Q2 serving as a second switching element, a transformer 11, a capacitor Cr serving as a resonance capacitor, a diode D1 serving as a first rectification element, a diode D2 serving as a second rectification element, a diode D3 serving as a third rectification element, a diode D4 serving as a fourth rectification element, and a diode D5 serving as a backflow prevention rectification element. Furthermore, the resonance power supply circuit 10 includes a capacitor C1 serving as a first capacitor, a capacitor C2 serving as a second capacitor, a switching element Q3 serving as a third switching element, an output capacitor Cout, a control integrated circuit (IC) 12 serving as a controller, and a feedback circuit 13. The switching elements Q1, Q2, and Q3 typically employ semiconductor switches such as field effect transistors (FETs). However, the devices are not limited to semiconductor switches. In particular, the switching element Q3 may be a mechanical switch, for example.

The switching elements Q1, Q2 are electrically coupled to each other in series. To allow terminals on a switching element Q1's side to each have a high potential, a direct-current voltage Vin supplied from a direct-current power supply is applied to both terminals of the switching elements Q1, Q2 coupled to each other in series. Switching of the switching elements Q1, Q2 between on and off is controlled by the control IC 12. The control IC 12 alternately turns on and off the switching element Q1 and the switching element Q2 to cause a primary winding wire L and the capacitor Cr to resonate with each other. A count of repetitions between an on state and an off state will be hereinafter referred to as a switching frequency fsw.

The transformer 11 includes the primary winding wire L and a secondary winding wire S. In the primary winding wire L, there are an excitation inductance Lm and a leakage inductance Lr in accordance with a coupling coefficient of the transformer 11. Note that, in FIG. 1, one end of the primary winding wire L is coupled to an electrical coupling point between the switching element Q1 and the switching element Q2, and a rectangular wave voltage is applied by the switching element Q1 and the switching element Q2. A current outputted from the power supply supplying the direct-current voltage Vin is then supplied to the primary winding wire L via the switching element Q1 that has been switched to the on state and the electrical coupling point.

Another end of the primary winding wire L is coupled to one end of the capacitor Cr. Another end of the capacitor Cr is coupled to a terminal that differs from the terminal on the electrical coupling point side of the switching element Q2. As described above, as the primary winding wire L and the capacitor Cr are electrically coupled to each other in series, the excitation inductance Lm, the leakage inductance Lr, and the capacitor Cr form a current resonance circuit. With resonance operations of this current resonance circuit, an alternating-current voltage is induced in the secondary winding wire S in the transformer 11. The secondary winding wire S in the transformer 11 is divided into a winding wire S1 serving as a first winding wire and a winding wire S2 serving as a second winding wire.

The diodes D1, D2, D3, and D4 are rectification elements that rectify a current that flows due to the alternating-current voltage generated in the secondary winding wire S. For the rectification elements, it is possible to use other rectification elements such as FETs, instead of diodes. A cathode of the diode D1 is electrically coupled to one end of the winding wire S1. A cathode of the diode D2 is electrically coupled to one end of the winding wire S2. An anode of the diode D1 and an anode of the diode D2 are coupled to each other in a common manner, and are coupled to one terminal of the capacitor C1, one terminal of the capacitor C2, and one terminal of the output capacitor Cout.

A coupling point between another end of the winding wire S1 and another end of the winding wire S2 is coupled to another terminal of the capacitor C1, the feedback circuit 13, and an anode of the diode D5. A cathode of the diode D5 is coupled to another terminal of the output capacitor Cout.

An anode of the diode D3 is electrically coupled to the one end of the winding wire S1. An anode of the diode D4 is electrically coupled to the one end of the winding wire S2. A cathode of the diode D3 and a cathode of the diode D4 are coupled to each other in a common manner, and are coupled to another terminal of the capacitor C2 and one terminal of the switching element Q3. Another terminal of the switching element Q3 is coupled to the cathode of the diode D5 and the other terminal of the output capacitor Cout.

The feedback circuit 13 feeds back and inputs voltage information indicating a voltage V1 serving as a first voltage of the capacitor C1 to the control IC 12. The control IC 12 controls switching operations for the switching elements Q1, Q2 based on the voltage information indicating the voltage V1 fed back. As the switching frequency fsw for the switching elements Q1, Q2 changes, the voltage V1 changes on a secondary side. The control IC 12 compares the voltage information fed back from the feedback circuit 13 with a comparison value that has been set beforehand, and, based on a comparison result, controls the switching frequency fsw for the switching elements Q1, Q2 to keep the voltage V1 constant. It is desirable that, in the feedback circuit 13, a primary side and the secondary side are insulated from each other. For example, a photocoupler is used to insulate the primary side and the secondary side from each other.

With the configuration described above, the resonance power supply circuit 10 supplies, in accordance with switching of the switching element Q1 and the switching element Q2 on the primary side, the alternating-current voltage to the winding wire S1 and the winding wire S2 on the secondary side. When the switching element Q3 is in the off state, the resonance power supply circuit 10 uses a first output circuit including the diodes D1, D2, the capacitor C1, the diode D5, and the output capacitor Cout to output an output voltage Vout1 (=V1). When the switching element Q3 is in the on state, the resonance power supply circuit 10 uses a second output circuit including the diodes D3, D4, the capacitor C2, the switching element Q3, and the output capacitor Cout to output an output voltage Vout2 (=V2). The diode D5 serves as the backflow prevention rectification element that suppresses a charging current flowing from the output capacitor Cout to the capacitor C1. Note that FIG. 1 illustrates the output voltage Vout1 and the output voltage Vout2 as the output voltage Vout. FIGS. 3, 5, 6, and 7 described later illustrate, similar to FIG. 1, the output voltage Vout1 and the output voltage Vout2 as the output voltage Vout.

As the diodes D3, D4 are in a series state with respect to the winding wire S1 and the winding wire S2 to rectify a current, the second output circuit is able to produce the output voltage Vout2 that is higher than the output voltage Vout1. For example, when a number of turns in the winding wire S1 and a number of turns in the winding wire S2 are identical to each other, the output voltage Vout2 is approximately twice the output voltage Vout1.

Figure 2:
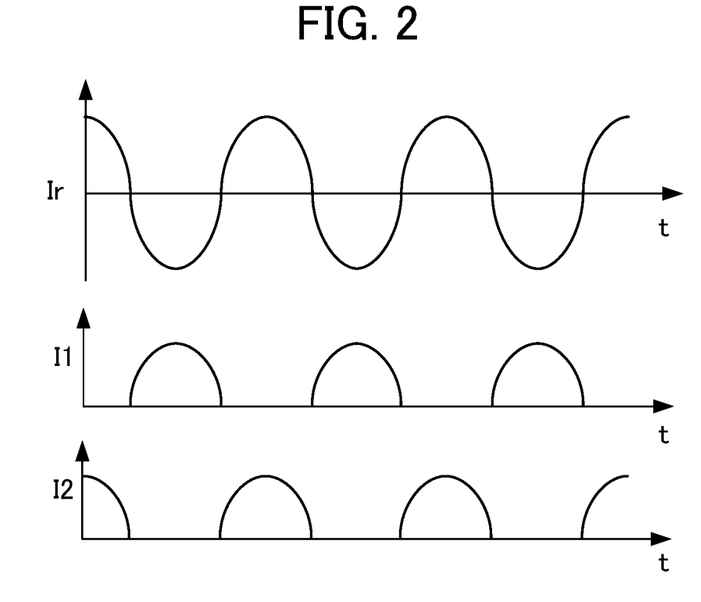
FIG. 2 is a characteristic diagram illustrating a current flowing in the resonance power supply circuit.

Next, operation of the resonance power supply circuit 10 will be described with reference to FIGS. 1 and 2. FIG. 2 is a characteristic diagram illustrating a current flowing in the resonance power supply circuit 10. Operation on the primary side in the resonance power supply circuit 10 will first be described. In the resonance power supply circuit 10, as illustrated in FIGS. 1 and 2, the control IC 12 first performs controls, the switching element Q1 is switched to the on state, and the switching element Q2 is switched to the off state, allowing a current Ir flowing in one direction (for example, a current flowing in a positive direction) to flow into the winding wire L on the primary side in the transformer 11. Next, as the control IC 12 performs controls, the switching element Q1 is switched to the off state, and the switching element Q2 is switched to the on state, allowing a current −Ir flowing in a direction opposite to the one direction (for example, a current flowing in a negative direction) to flow from the capacitor Cr into the primary winding wire L in the transformer 11. This phenomenon occurs when current resonances occur in the current resonance circuit including the capacitor Cr, the excitation inductance Lm, and the leakage inductance Lr. As described above, in the resonance power supply circuit 10, alternate turning of the switching elements Q1, Q2 between on and off is repeated to allow the current Ir and the current −Ir, which differ in direction from each other, to alternately flow into the winding wire L in the transformer 11. As these operations are repeated, an alternating-current voltage is then induced on a winding wire S's side on the secondary side in the transformer 11.

Next, operation on the secondary side in the resonance power supply circuit 10 will be described. Operation in the first output circuit in a case where the switching element Q3 is switched to the off state will first be described. The alternating-current voltage induced on the winding wire S's side in the transformer 11, which is generated when the current Ir flowing in the positive direction flows, generates a current I2 flowing through the diode D2 and the winding wire S2. On the other hand, the alternating-current voltage induced on the winding wire S's side in the transformer 11, which is generated when the current −Ir flowing in the negative direction flows, generates a current I1 flowing through the diode D1 and the winding wire S1. The alternating-current voltages that are generated when the current Ir and the current −Ir flow serve as a first alternating-current voltage, and the diode D1 and the diode D2 serve as the first rectification element and the second rectification element that extract the first alternating-current voltage. As described above, at the coupling point between the other end of the winding wire S1 and the other end of the winding wire S2, the current I1 and the current I2 alternately flow, charge is accumulated in the capacitor C1 by the current I1 and the current I2 (a current I1+I2), and the voltage V1 that has been smoothened is generated in the capacitor C1. Charge is also accumulated in the output capacitor Cout via the diode D5 by the current I1 and the current I2 (the current I1+I2), the voltage V1 is generated in the output capacitor Cout, and the voltage V1 is outputted as the output voltage Vout1.

Next, operation in the second output circuit in a case where the switching element Q3 is switched to the on state will be described. The alternating-current voltage induced on the winding wire S's side in the transformer 11, which is generated when the current Ir flowing in the positive direction flows, generates a current I3 flowing through the winding wire S1, the winding wire S2, and the diode D3. On the other hand, the voltage induced on the winding wire S's side in the transformer 11, which is generated when the current −Ir flowing in the negative direction flows, generates a current I4 flowing through the winding wire S1, the winding wire S2, and the diode D4. The alternating-current voltages that are generated when the current Ir and the current −Ir flow serve as a second alternating-current voltage, and the diode D3 and the diode D4 serve as the third rectification element and the fourth rectification element that extract the second alternating-current voltage. As described above, at the coupling point between the diode D3 and the diode D4, the current I3 and the current I4 alternately flow, charge is accumulated in the capacitor C2 by the current I3 and the current I4 (a current I3+I4), and the voltage V2 that has been smoothened to serve as a second voltage is generated in the capacitor C2. Charge is also accumulated in the output capacitor Cout via the switching element Q3 by the current I3 and the current I4 (the current I3+I4), the voltage V2 is generated in the output capacitor Cout, and the voltage V2 is outputted as the output voltage Vout2.

In the resonance power supply circuit 10 according to the present embodiment, providing the second output circuit in addition to the first output circuit to configure a single circuit makes it possible to generate voltages, i.e., the voltage V1 and the voltage V2, which differ from each other in voltage value. As a result, it is not necessary to provide a resonance power supply circuit per a voltage value to be outputted, making it possible to achieve a reduction in circuit size and to configure an inexpensive circuit. In the present embodiment, when switching takes place in the switching element Q3 from the off state to the on state, the diode D5 suppresses a charging current flowing from the output capacitor Cout to the capacitor C1. Therefore, it is not necessary to strengthen, in performance, the direct-current power supply on the primary side in response to switching of an output voltage.

Second Embodiment

Figure 3:
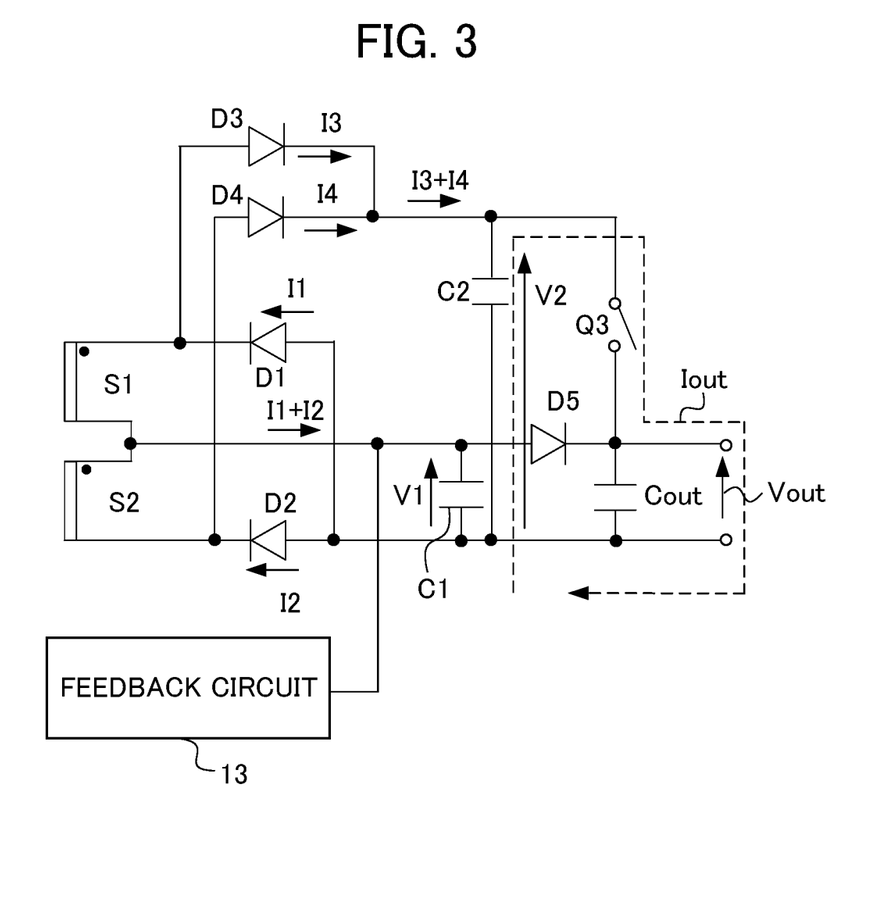
FIG. 3 is a diagram illustrating a part of the resonance power supply circuit.

In the first embodiment, a location at which the capacitor C1 and the capacitor Cout are electrically coupled to each other will be hereinafter referred to as GND. In the first embodiment, when the capacitor C2 and GND are coupled to each other, and, as illustrated by a dashed line in FIG. 3, in a case where the switching element Q3 is switched to the on state, a load fluctuation in the output voltage Vout2 (a fluctuation in Iout) is not transferred to the voltage V1 being fed back. FIG. 3 is a diagram illustrating a part of the resonance power supply circuit. Therefore, in the first embodiment, although the voltage V1 stays in such a regulation that its state is lighter in load (high frequency operation), the load becomes heavier in an actual case where the switching element Q3 is switched to the on state and driving takes place at an output voltage of the voltage V2, and the output voltage of the voltage V2 drops in accordance with a magnitude of the load (Iout) (resulting in a poor load regulation).

Figure 4:
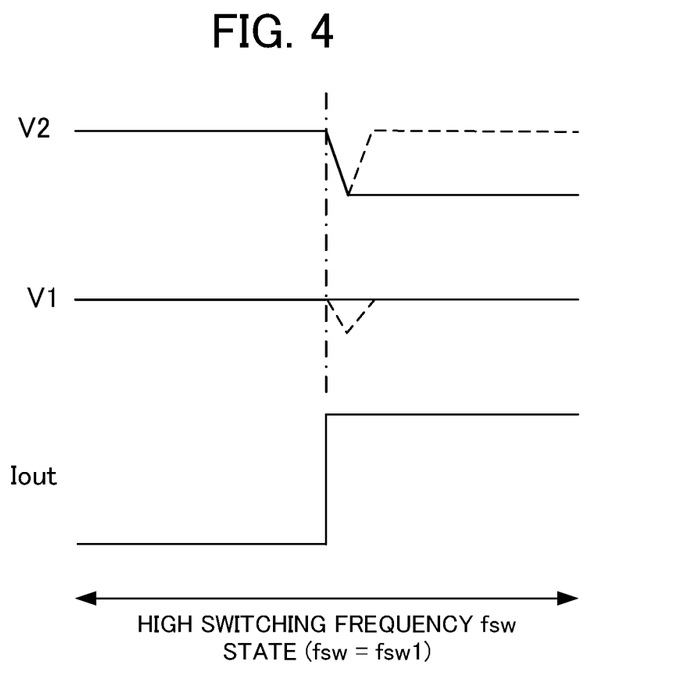
FIG. 4 is a characteristic diagram illustrating a situation where a switching frequency fsw is not optimized and a voltage V2 drops.

FIG. 4 is a characteristic diagram illustrating a situation where the switching frequency fsw is not optimized and the voltage V2 drops. As illustrated by a dashed line in FIG. 4, it is desirable that, even when a voltage drops excessively, the voltage recovers immediately to keep the voltage V2. However, when the voltage V1 being fed back is constant, the switching frequency fsw is kept in a high state (fsw=fsw1), and the load current Iout increases, the output voltage of the voltage V2 drops in accordance with the magnitude of the load current Iout, as illustrated by a solid line.

Figure 5:
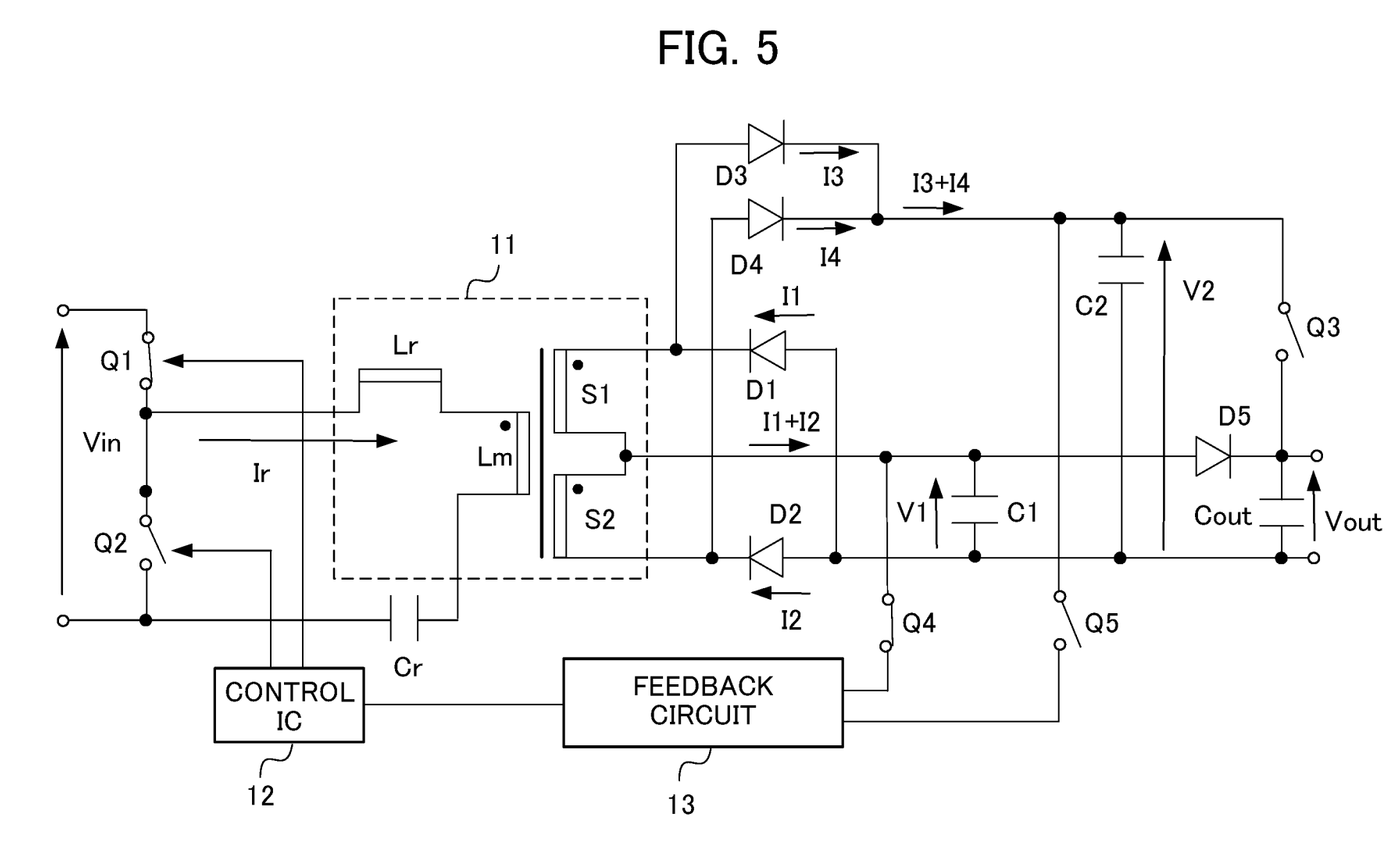
FIG. 5 is a circuit diagram illustrating a resonance power supply circuit according to a second embodiment of the present disclosure.

In the present embodiment, switching of the switching element Q3 between on and off makes it possible to switch a destination to which the feedback circuit is coupled to change the switching frequency. FIG. 5 is a circuit diagram illustrating a resonance power supply circuit according to a second embodiment of the present disclosure. As illustrated in FIG. 5, the feedback circuit 13 is coupled to a coupling wire for the other terminal (the terminal coupled to the diode D5) of the capacitor C1 via the switching element Q4 serving as a fourth switching element. Furthermore, the feedback circuit 13 is coupled to a coupling wire for the other terminal (the terminal coupled to the coupling point between the cathode of the diode D3 and the cathode of the diode D4) of the capacitor C2 via the switching element Q5 serving as a fifth switching element.

The switching elements Q4, Q5 are provided to switch the destination to which the feedback circuit 13 is coupled. When the switching element Q3 is in the on state, the switching element Q5 is switched to the on state and the switching element Q4 is switched to the off state, making the destination to which the feedback circuit 13 is coupled the coupling wire for the other terminal (the terminal coupled to the coupling point between the cathode of the diode D3 and the cathode of the diode D4) of the capacitor C2. As a result, it is possible to transfer voltage fluctuations in the voltage V2 serving as the second voltage, as voltage information indicating the second voltage, to the control IC 12 via the feedback circuit 13, allowing control of the switching frequency fsw by the control IC 12 to stabilize the voltage V2 even when there is a load fluctuation (improving the load regulation). When the switching element Q3 is in the off state, the switching element Q4 is switched to the on state and the switching element Q5 is switched to the off state, making the destination to which the feedback circuit 13 is coupled the other terminal (the terminal coupled to the diode D5) of the capacitor C1. As a result, it is possible to transfer voltage fluctuations in the voltage V1 serving as the first voltage, as voltage information indicating the first voltage, to the control IC 12 via the feedback circuit 13, allowing control of the switching frequency fsw by the control IC 12 to stabilize the voltage V1 even when there is a load fluctuation. In the feedback circuit 13, output voltages differ from each other when the switching element Q4 is in the on state and when the switching element Q5 is in the on state. Therefore, the switching elements Q4, Q5 are coupled to make feedback circuit constants when each one is coupled differ from each other. Although, as to voltages to be inputted into the feedback circuit 13, the voltage V1 and the voltage V2, the voltage values of which differ from each other, are inputted, the feedback circuit constants in the feedback circuit 13 make it possible to change a ratio between the voltage V1 and the voltage V2.

Figure 6:
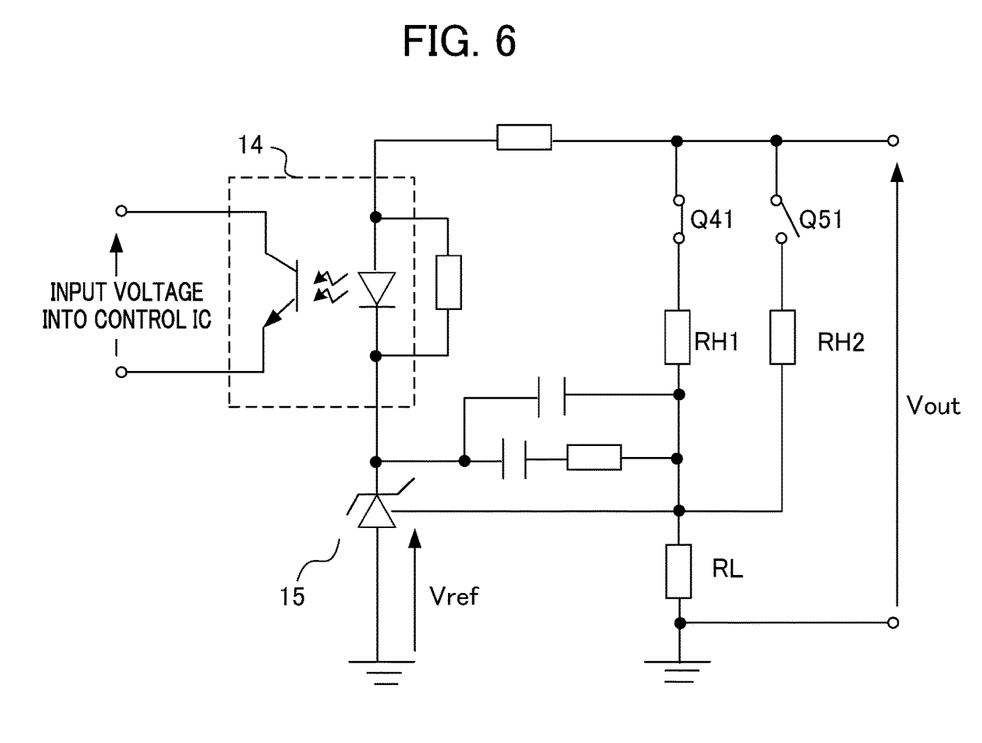
FIG. 6 is a diagram illustrating a configuration of a feedback circuit in the resonance power supply circuit according to the second embodiment.

FIG. 6 is a diagram illustrating a configuration example of the feedback circuit. The feedback circuit 13 includes a combination of a photocoupler 14 that insulates an input side and an output side from each other and a shunt regulator 15 that produces a reference voltage on the output side, for example. A switching element Q41 is turned on or off as the switching element Q4 is turned on or off, and a switching element Q51 is turned on or off as the switching element Q5 is turned on or off. In a case where the switching element Q4 is turned to the on state and the switching element Q41 is turned to the on state, the output voltage Vout1 becomes equal to the voltage V1. On the other hand, in a case where the switching element Q5 is turned to the on state and the switching element Q51 is turned to the on state, the output voltage Vout2 becomes equal to the voltage V2 (>V1). Note that, when a reference voltage Vref is produced in the shunt regulator 15, changing a ratio between a resistance value of a resistor RH1 with respect to a resistance value of a resistor RL and a resistance value of a resistor RH2 with respect to the resistance value of the resistor RL makes it possible to change the ratio between the voltage V1 and the voltage V2.

Third Embodiment

Figure 7:
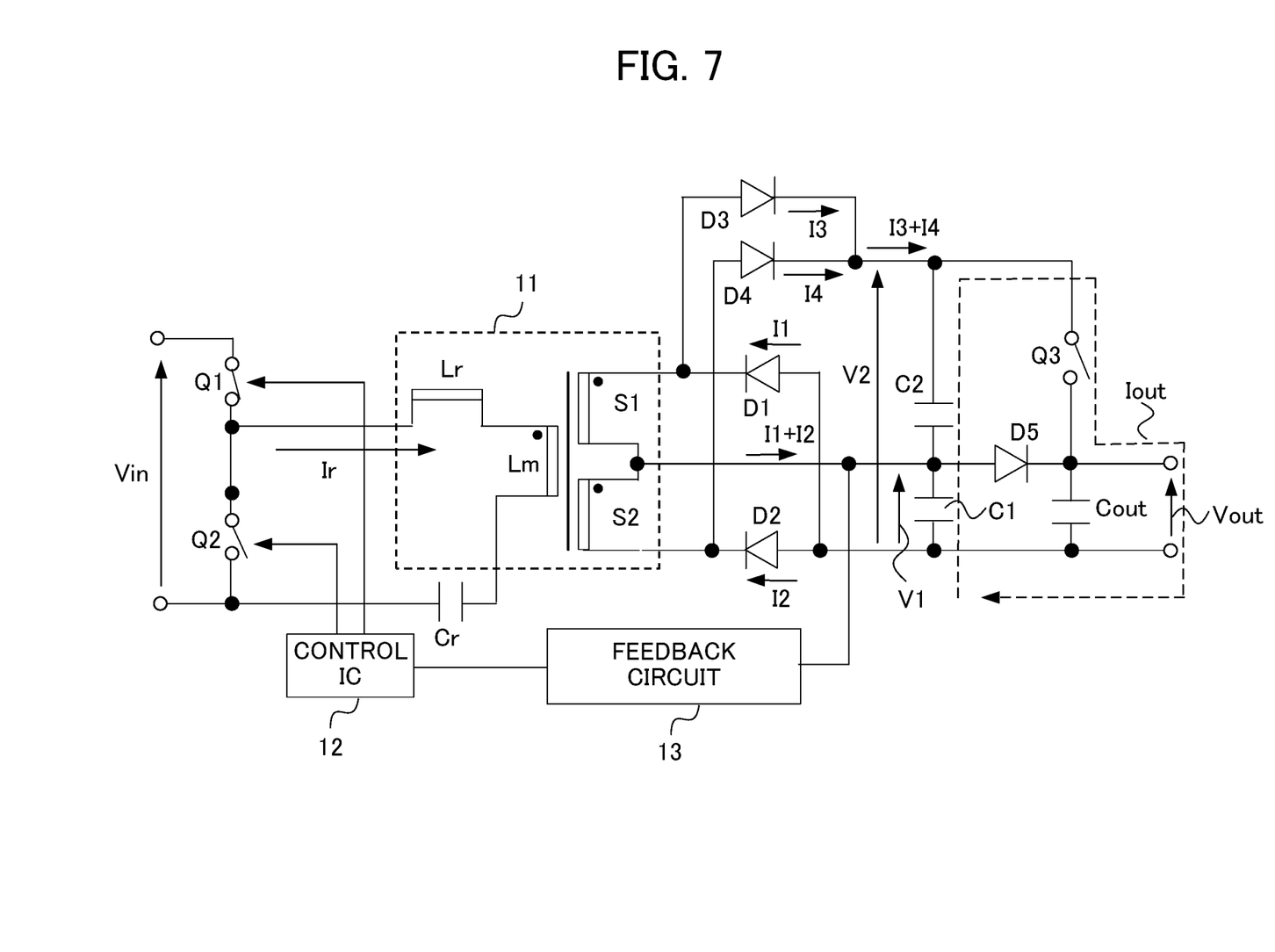
FIG. 7 is a circuit diagram illustrating a resonance power supply circuit according to a third embodiment of the present disclosure.
Figure 8:
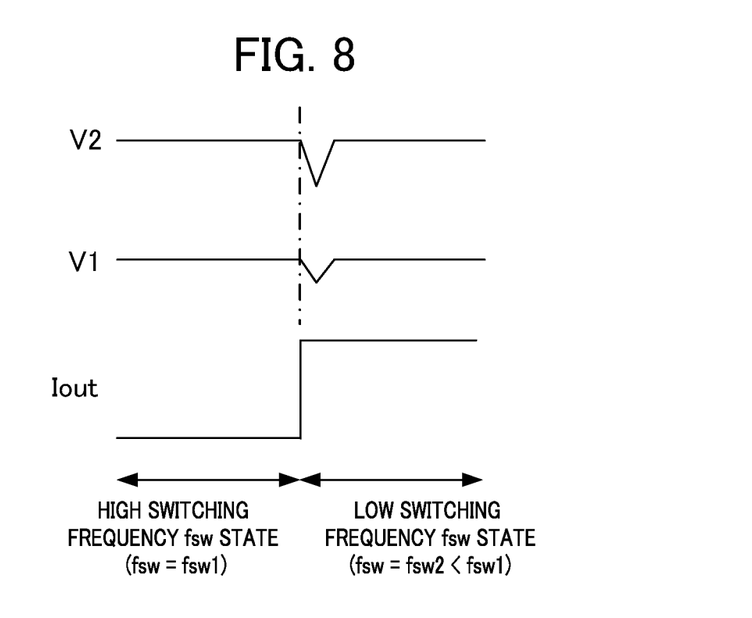
FIG. 8 is a characteristic diagram illustrating a situation where the switching frequency fsw is changed and the voltage V2 becomes stable even when there is a load fluctuation.

In the second embodiment, when the switching element Q3 is switched between on and off, the switching elements Q5, Q4 have been switched to switch the destination to which the feedback circuit is coupled to change the switching frequency fsw. In the present embodiment, the capacitor C2 is coupled to the capacitor C1 in series to cause a load fluctuation in the output voltage Vout2 to be transferred to the voltage V1. FIG. 7 is a circuit diagram illustrating a resonance power supply circuit according to a third embodiment of the present disclosure. As illustrated in FIG. 7, the one terminal (the terminal on the opposite side to the terminal on the side coupled to the diode D3 and the diode D4) of the capacitor C2 is coupled to the other terminal (the terminal coupled to the diode D5) of the capacitor C1 to couple the capacitor C2 to the capacitor C1 in series. Coupling the capacitor C2 to the capacitor C1 in series allows, even when the switching element Q3 is in the on state, fluctuations in the voltage V2, i.e., load fluctuations in the output voltage Vout2 are transferred to the feedback circuit 13 as fluctuations in the voltage V1. In the present embodiment, compared with the second embodiment, changing only the destination to which the capacitor C2 is coupled makes it possible to improve the load regulation without an increase in cost (without an increase in circuit size). FIG. 8 is a characteristic diagram illustrating a situation where the switching frequency fsw is changed and the voltage V2 becomes stable even when there is a load fluctuation. This makes it possible to secure responsiveness relative to a load fluctuation when switching of an output voltage takes place.

Figure 9:
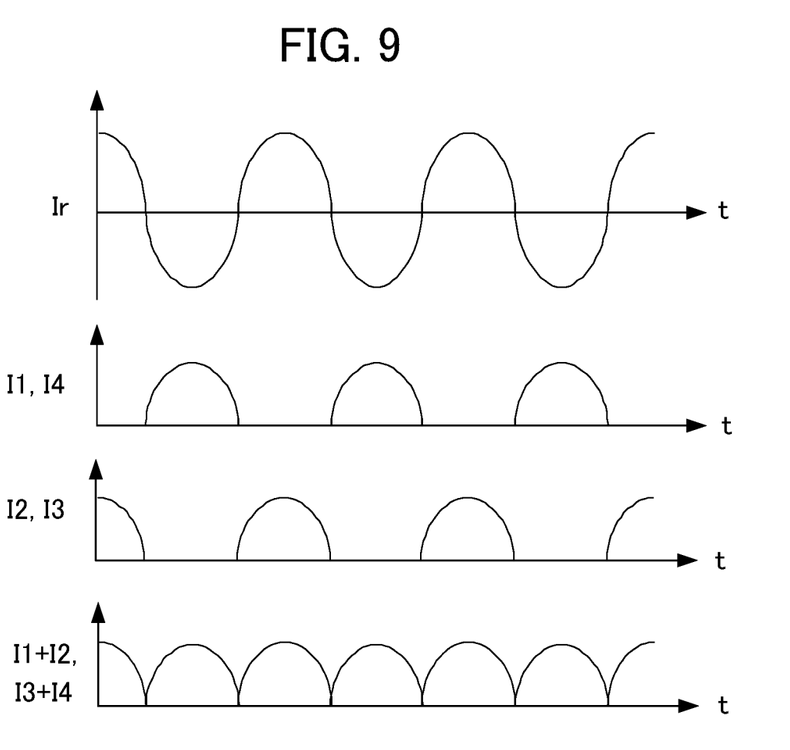
FIG. 9 is a characteristic diagram illustrating a current flowing in the resonance power supply circuit in the resonance power supply circuit according to the third embodiment.

In the present embodiment, it is desirable that a capacitance value of the capacitor C1 and a capacitance value of the capacitor C2 are equal to each other. By making the capacitance value of the capacitor C1 and the capacitance value of the capacitor C2 equal to each other, as illustrated in FIG. 9, current waveforms of the currents I1, I2, I3, I4 substantially coincide with each other. Therefore, it is possible to use both the winding wires S1, S2 in a well-balanced manner. FIG. 9 is a characteristic diagram illustrating a current flowing in the resonance power supply circuit 10. When the capacitance value of the capacitor C1 is made equal to the capacitance value of the capacitor C2, it is possible to use the voltage V1 to detect approximately half of a voltage fluctuation that occurred in the voltage V2, further improving the regulation accuracy. One reason for this is that, the voltage V1 between both the ends of the capacitor C1 and the voltage between both the ends of the capacitor C2 become substantially equal to each other, and the supplied current I1+I2 and the supplied current I3+I4 are also substantially equal to each other, further stabilizing the load regulation.

With the resonance power supply circuits according to the first embodiment, the second embodiment, and the third embodiment as described above, it is possible to allow even a small-size inexpensive circuit configuration to output a plurality of different output voltages.

Each of the above-described embodiments represents a preferred embodiment of the present invention. However, the scope of the present invention is not limited to the embodiments described above, and it is possible to embody the present invention in various modifications without departing from the spirit of the present invention.

For example, such examples have been described in which, in the resonance power supply circuits according to the first embodiment, the second embodiment, and the third embodiment, the secondary winding wire S in the transformer T is divided into two winding wires, i.e., the winding wires S1, S2. However, the present disclosure is not limited to these configurations. The secondary winding wire S in the transformer 11 may include three or more winding wires. For example, when the secondary winding wire S in the transformer 11 includes winding wires S11, S12, S13, the first output circuit and the second output circuit are coupled to each other similar to the resonance power supply circuit illustrated in FIG. 1, 5, or 7 for the winding wires S11, S12, and a third output circuit that is similar in configuration to the second output circuit is coupled for the winding wires S11, S13. Specifically, in the third output circuit, an anode of a diode is coupled to one side of the winding wire S13 and an anode of a diode is coupled to one side of the winding wire S11, and cathodes of the two diodes are coupled to a capacitor and then coupled to the output capacitor Cout via a switching element. As described above, when the secondary winding wire S in the transformer 11 includes three winding wires, and the resonance power supply circuit includes three output circuits, it is possible to output three output voltages.

It is possible that the resonance power supply circuit according to the present disclosure takes various types of embodiments having configurations described below, including the embodiments described above.

(1) A resonance power supply circuit includes: a transformer including a primary winding wire (L) and a secondary winding wire (S) including at least a first winding wire (S1) and a second winding wire (S2); a first switching element (Q1) and a second switching element (Q2) that apply a rectangular wave voltage to one end of the primary winding wire; a resonance capacitor (Cr) coupled to another end of the primary winding wire; a controller (12) that alternately turns on or off the first switching element and the second switching element to cause the primary winding wire and the resonance capacitor to resonate with each other; a first output circuit including a first rectification element (D1) and a second rectification element (D2) that extract a first alternating-current voltage induced in the secondary winding wire, a first capacitor (C1) that smoothens the extracted first alternating-current voltage, an output capacitor (Cout) that outputs an output voltage, and a backflow prevention rectification element (D5) that suppresses a current flowing from the output capacitor into the first capacitor; a second output circuit including a third rectification element (D3) and a fourth rectification element (D4) that extract a second alternating-current voltage induced in the secondary winding wire, a second capacitor (C2) that smoothens the extracted second alternating-current voltage, the output capacitor, and a third switching element (Q3) provided between the second capacitor and the output capacitor; and a feedback circuit (13) that feeds back voltage information indicating a first voltage of the first capacitor to the controller. With this resonance power supply circuit, it is possible to use a single small-size inexpensive circuit to output a plurality of different output voltages.

(2) The resonance power supply circuit described in (1) above, further includes: a fourth switching element (Q4) provided between the first capacitor and the feedback circuit; and a fifth switching element (Q5) provided between the second capacitor and the feedback circuit, in which the feedback circuit feeds back voltage information indicating the first voltage of the first capacitor to the controller when the fourth switching element is in an on state, and feeds back voltage information indicating a second voltage of the second capacitor to the controller when the fifth switching element is in an on state. With this resonance power supply circuit, it is possible to transfer voltage fluctuations in the second voltage to the controller, stabilizing the second voltage even when there is a load fluctuation.

(3) The resonance power supply circuit described in (1) above, in which a terminal on a side coupled to the third rectification element and the fourth rectification element and a terminal on an opposite side in the second capacitor are coupled to a terminal on a side coupled to the backflow prevention rectification element in the first capacitor. With this resonance power supply circuit, simply changing a destination to which the capacitor C2 is coupled makes it possible to transfer voltage fluctuations in the second voltage to the controller, stabilizing the second voltage even when there is a load fluctuation.

(4) The resonance power supply circuit described in (3) above, in which a capacitance value of the first capacitor and a capacitance value of the second capacitor are identical to each other. With this resonance power supply circuit, it is possible to use the first voltage to detect half of a voltage fluctuation that occurred in the second voltage, further improving the regulation accuracy.

EXPLANATION OF REFERENCE NUMERALS

10 Resonance power supply circuit
11 Transformer
12 Control IC
13 Feedback circuit
Q1, Q2, Q3, Q4, Q5 Switching element
L Primary winding wire
S Secondary winding wire S1, S2 Winding wire
Lr Leakage inductance
Lm Excitation inductance
C1, C2, Cr, Cout Capacitor
D1, D2, D3, D4, D5 Diode

The invention claimed is:

1. A resonance power supply circuit comprising:
    a transformer including a primary winding wire and a secondary winding wire including at least a first winding wire and a second winding wire;
    a first switching element and a second switching element that apply a rectangular wave voltage to one end of the primary winding wire;
    a resonance capacitor coupled to another end of the primary winding wire;
    a controller that alternately turns on and off the first switching element and the second switching element to cause the primary winding wire and the resonance capacitor to resonate with each other;
    a first output circuit including a first rectification element and a second rectification element that extract a first alternating-current voltage induced in the secondary winding wire, a first capacitor that smoothens the extracted first alternating-current voltage, an output capacitor that outputs an output voltage, and a backflow prevention rectification element that suppresses a current flowing from the output capacitor into the first capacitor;
    a second output circuit including a third rectification element and a fourth rectification element that extract a second alternating-current voltage induced in the secondary winding wire, a second capacitor that smoothens the extracted second alternating-current voltage, the output capacitor, and a third switching element provided between the second capacitor and the output capacitor; and
    a feedback circuit that feeds back voltage information indicating a first voltage of the first capacitor to the controller,
    wherein the output capacitor outputs either a first output voltage generated by the first output circuit or a second output voltage generated by the second output circuit, and outputs the second output voltage when the third switching element is in an on state.

2. The resonance power supply circuit according to claim 1, further comprising:
    a fourth switching element provided between the first capacitor and the feedback circuit; and
    a fifth switching element provided between the second capacitor and the feedback circuit,
    wherein the feedback circuit feeds back voltage information indicating the first voltage of the first capacitor to the controller when the fourth switching element is in an on state, and feeds back voltage information indicating a second voltage of the second capacitor to the controller when the fifth switching element is in an on state.

3. The resonance power supply circuit according to claim 1, wherein one terminal of the second capacitor is coupled to the third rectification element and the fourth rectification element, one terminal of the first capacitor is coupled to both the backflow prevention rectification element and the other terminal of the second capacitor.

4. The resonance power supply circuit according to claim 3, wherein a capacitance value of the first capacitor and a capacitance value of the second capacitor are identical to each other.

* * * * *